United States Patent [19]

Iwabuchi

[11] Patent Number: 5,174,335
[45] Date of Patent: Dec. 29, 1992

[54] BIDIRECTIONAL VACUUM VALVE

[75] Inventor: Toshiaki Iwabuchi, Chigasaki, Japan

[73] Assignee: Kabushiki Kaisha Com., Tokyo, Japan

[21] Appl. No.: 876,529

[22] Filed: Apr. 30, 1992

[51] Int. Cl.⁵ .......................................... G05D 16/00
[52] U.S. Cl. ................... 137/624.18; 137/625.3; 137/629; 251/28
[58] Field of Search ............ 137/624.18, 624.2, 625.3, 137/629; 251/28, 210

[56] References Cited

U.S. PATENT DOCUMENTS

| | | | |
|---|---|---|---|
| 3,757,820 | 9/1973 | Aylesworth | 137/625.3 |
| 3,821,968 | 7/1974 | Barb | 137/625.3 |
| 4,672,203 | 6/1987 | Holkeboer | 137/630.15 |

*Primary Examiner*—Alan Cohan
*Attorney, Agent, or Firm*—Lieberman, Rudolph & Nowak

[57] ABSTRACT

To evacuate a vacuum chamber without stirring up particles in the chamber or associated piping, a pneumatically-actuated vacuum valve is used between the chamber and the vacuum pump. The valve controls evacuation in two stages: in the first stage, the valve partially opens, and a skirt with leak vents in it is brought into play so that air is drawn slowly through the leak vents to gradually achieve a vacuum of a few Torr without stirring up particles; in the second stage, the valve fully opens, and the remaining air in the chamber can be drawn out efficiently, utilizing the large diameter of the valve fully, without risk of stirring up particles. The actuation of the valve is controlled by a timer, which dictates how long the valve stays in the partially-open state before switching to the fully-open state.

6 Claims, 5 Drawing Sheets

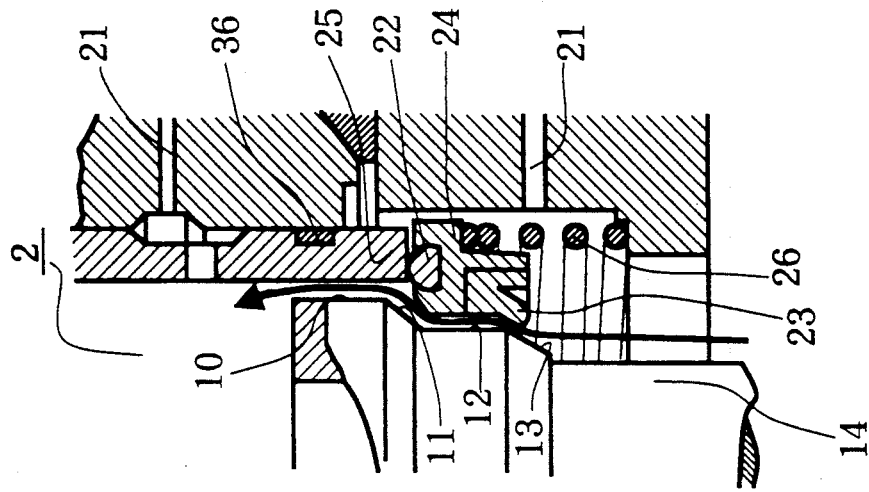
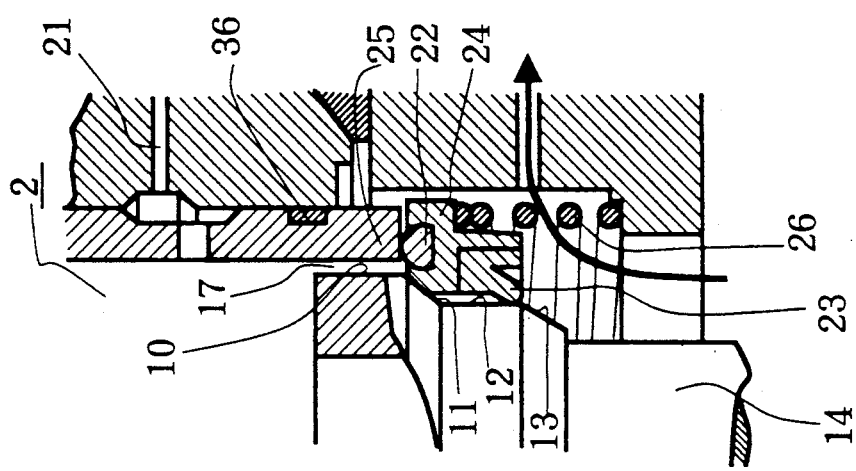
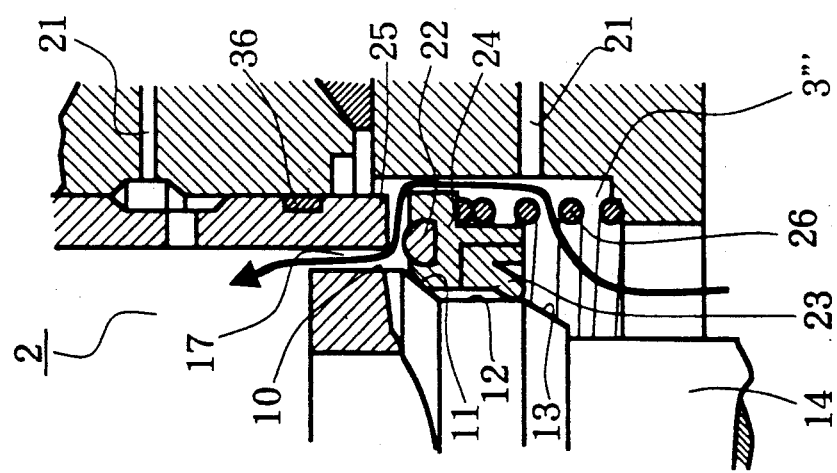

BIDIRECTIONAL VACUUM VALVE

BACKGROUND OF THE INVENTION

The present invention relates to a bidirectional vacuum valve interposed between a vacuum chamber and a vacuum pump when evacuating the vacuum chamber.

Up to now, to evacuate a chamber used in such processes as the manufacture of semiconductors or the like, an arrangement shown in FIG. 8 has been used. In this arrangement, a chamber (101) is connected to a vacuum pump (102) by a pipe (103), and the vacuum pump draws air out of the chamber. However, since there is only one vacuum valve (104) between the vacuum pump (102) and the vacuum chamber (101), the rapid and forceful evacuation that occurs when the valve is opened causes turbulence in the vacuum chamber (101) and the pipe (103), stirring up particles such as dusts that are detrimental to the process.

This disturbance of particles can be prevented by modifying the arrangement to give the arrangement shown in FIG. 9. The modification consists of the addition of a bypass line (106) provided with a small-diameter valve (105) to bypass the large-diameter valve (104) in the main vacuum line. Evacuation takes place while simultaneously controlling the two vacuum valves, creating a vacuum step by step. First the small-diameter valve (105) is opened, and the vacuum pump (102) evacuates the vacuum chamber (101) and the pipe (103) to several Torr.

At a vacuum of several Torr, there are not enough particles to be stirred up, and the large-diameter valve (104) can now be fully opened, allowing air to be drawn out of the vacuum chamber stably. However, operating the small-diameter valve (105) and large-diameter valve (104) with a controller causes two problems: control is very complicated and the cost is high. And if the valves are operated manually, misoperation may occurs.

SUMMARY OF THE INVENTION

The present invention solves the problems associated with the previous technology by leading pressurized gas to an actuator in a single-actuator vacuum valve just by opening a solenoid valve, making the vacuum valve move automatically from a slow exhaust to a large-diameter exhaust.

The object of the present invention is to provide a bidirectional vacuum valve disposed between a vacuum chamber and a vacuum pump to evacuate the vacuum chamber gradually.

The bidirectional vacuum valve according to the present invention is characterized by comprising that a first shifting means for shifting a piston to a predetermined position as a result of imbalance of pressurized gas applied onto said piston in the inside of a cylinder casing, when said vacuum valve is opened; a second shifting means for shifting the piston further from the predetermined shifting position of the pressurized gas generated by opening the vacuum valve at after certain time at the predetermined shifting position; a skirt piece having a leak vent which connects the vacuum chamber to said vacuum pump as a result of the shift of said piston by the first shifting means; and a main valve apparatus having a large diameter which connects said vacuum chamber with said vacuum valve as a result of the shift of the piston by the second shifting means.

Further objects and advantages of the present invention will appear from the following description of embodiments of the present invention, when considered in connection with the accompanying drawings, and the novel features will be particularly appointed out in the appended claims.

BRIEF DESCRIPTION OF THE DRAWINGS

FIGS. 2a, 2b and 2c are enlarged views of A part shown in FIG. 1 each of which illustrates operation of the part respectively;

PREFERRED EMBODIMENTS OF THE INVENTION

Figure 1:
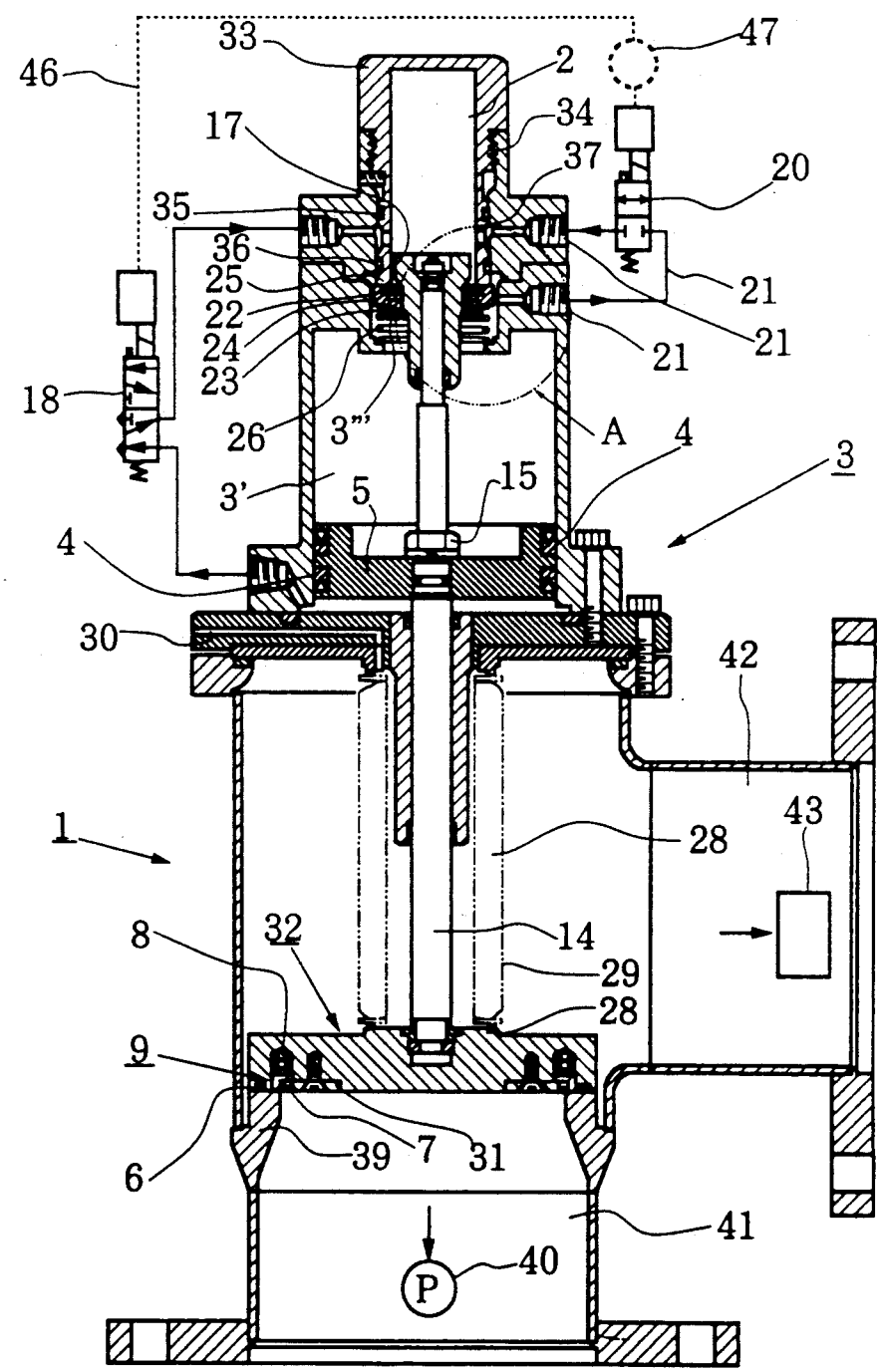
FIG. 1 is a vertically sectioned view of a first embodiment of the present invention.

FIGS. 1 and 2 show the first embodiment of the present invention in which a bidirectional vacuum valve whose primary components are a valve housing (1) and, on top of this, a cylinder casing (3). The cylinder casing (3) contains a piston (5) sealed with packing (4), which together constitute an actuator cylinder.

Within the cylinder casing (3) are a primary cylinder chamber, which is partitioned by the piston (5) into an upper primary cylinder chamber (3') and a lower primary cylinder chamber (3''); and above this, a secondary cylinder chamber (3'''). The secondary cylinder chamber (3''') is connected to a pressure chamber (2), which is closed at one end, by a mouth (17), and the end of a stem (14), described later, travels within the pressure chamber (2). The lower primary cylinder chamber (3'') and the pressure chamber (2) are connected to a main solenoid valve (18), which is a four-way device that switches the supply and drain of pressurized gas to and from the two chambers.

The stem (14) passes through the center of the piston (5) from bottom to top, and has a male thread that allows the piston to be secured to the stem (14) from above by a nut (15). The top of the stem (14) comprises a first cylindrical section (10), a first tapered section (11), a second cylindrical section (12), and a second tapered section (13).

The pressure chamber (2) and the secondary cylinder chamber (3''') are penetrated by two bypass channels (21), by which they can be connected externally. The actuator of an auxiliary solenoid valve (20) is connected to a timer (47), which is connected to the actuator of the main solenoid valve (18) by a signal line (46).

At the first tapered section (11) of the stem (14), when it is within the secondary cylinder chamber (3'''), there is a seal carrier (24) carrying a ring seal (22) of semicircular profile, which contacts a valve seat (25) above, and lip packing (23). The seal carrier (24) is pushed by a compression spring (26), and can move within the secondary cylinder chamber (3'''), there being a slight gap betwewen it and the inner surface of the chamber. The contact area between the seal carrier (24) and the first tapered section (11) has notches that allow air to pass.

At the end of the stem (14) rising within the valve housing (1) is a valve head (32), which is sealed to the stem (14) by a pedestal (28) on the upper side of the valve head (32) and a bellows (29), which extends above the pedestal. Within the bellows (29) a large volume of air can be introduced via a large-capacity vent (30). A ring-shaped skirt piece (9) is pushed from within a circular groove (7) by springs (8) inside a ring seal (6) which is in the valve head (32). The skirt piece (9) consists of a skirt rim (16) and, perpendicualr to this, a skirt (19); around the surface of the skirt (19) there are several notches (27) that act as a leak vent. The skirt rim (16) is pushed in the direction of the valve seat (39) by the springs (8); also a stop (31) is attached, allowing movement over a range of 2 mm.

A port 1 (41), which is in the valve seat (39) that works in conjunction with the valve head (32), is connected to a vacuum pump (40); port 2 (42), which is above the valve seat (39), is connected to a vacuum chamber (43).

In this embodiment, actuating the main solenoid valve (18) exhausts the lower primary cylinder chamber (3″) and fills the pressure chamber (2). The uppr primary cylinder chamber (3′) then contains pressurized gas, so the piston (5) is pushed down, and all parts take the positions shown in FIG. 1. In this state, the distance (h1) between the valve seat (25) and the ring seal (22) is about 1 mm, so the skirt piece (9) can move down 2 mm, both distances being controlled.

FIG. 2 shows a magnified view of area A of Fig. 1; by actuating the main solenoid valve (18), pressureized gas is introduced into the lower primary cylinder chamber (3″), and the pressure chamber (2) is exhausted, so gas flows into the space between the wall of the secondary cylinder chamber (3‴) and the seal carrier (24), through the mouth (17), and into the pressure chamber (2). The piston (5) is gradually raised by the pressure, and when the ring seal (22) touches the valve seating (25), the pressurized gas stops flowing into the pressure chamber (2), as shown in FIG. 2 (b).

By actuating the main solenoid valve (18), a signal is sent from the main solenoid valve (18) via the signal line (46) to the timer (47), starting the timer. When the timer (47) times out, a signal is sent from the timer (47) to the auxiliary solenoid valve (20), which opens, and the pressurized gas in the secondary cylinder chamber (3‴) and the upper primary cylinder chamber (3′) flows into the pressure chamber (2) via the bypass channels (21). The piston (5) now rises further to the position shown in FIG. 2 (c); the lip packing (23) separates from the second cylindrical section (12); and the pressurized gas in the secondary chamber (3‴) escapes to the pressure chamber (2) through the space between the second tapered section (13) and the lip packing (23).

From the position shown in FIG. 2 (a) to that shown in FIG. 2 (b), a rise (h1) of 1 mm, the skirt (19) can move down by a distance (h2) of 2 mm. In this state, only the valve head (32) rises, and the edge of the skirt (19) of the skirt piece (9) and the valve seat (39) are connected by being pushed by the springs (8), so that the air in the vacuum chamber (43) and the valve chamber (1) is gradually drawn into the vacuum pump (40) through the notches (27) of the skirt (19).

The time required to move from the position shown in FIG. 2 (b) to that shown in FIG. 2 (c) is already set by the timer (47) according to the volume of the vacuum chamber (43) and the capacity of the vacuum pump (40). During this time, the air pressure in the vacuum chamber (43) falls to several Torr as a result of employing only the skirt piece (9).

Figure 3:
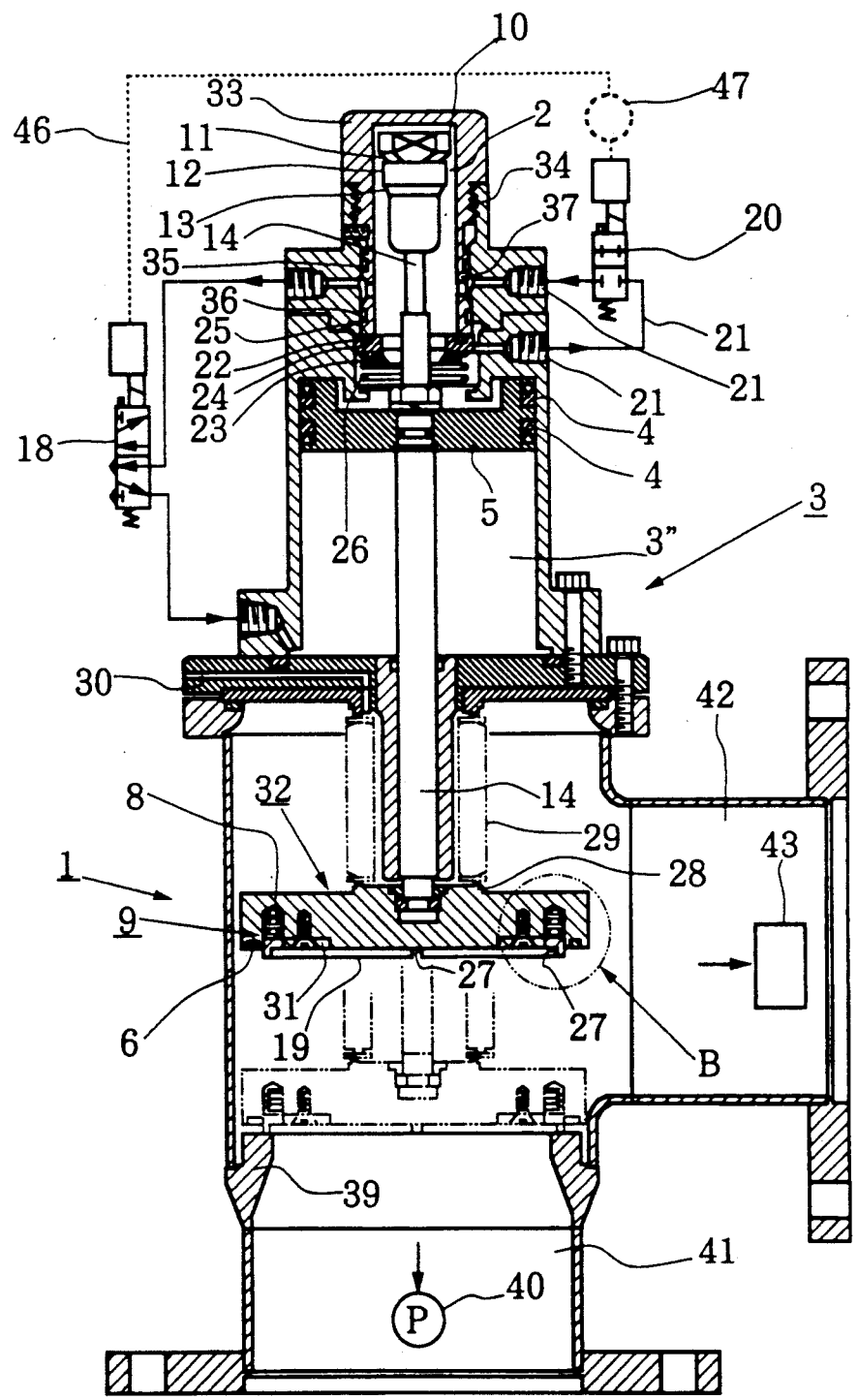
FIG. 3 is a vertically sectioned view showing the state of the embodiment in FIG. 1 after operation thereof being completed.

At the position shown in FIG. 2 (c), pressurized gas flows between the lip packing (23) and the second tapered section (13), and enters the pressure chamber (2) very rapidly, so that the skirt piece (9) rises with the valve head (32), as shown in FIG. 3, and the remaining air is rapidly exhausted. Pressurized gas is then introduced into the pressure chamber (2) by actuating the main solenoid valve (18) to exhaust the lower primary cylinder chamber (3″). The pressurized gas is introduced from the pressure chamber (2) into the upper primary cylinder chamber (3′) by opening the lip packing (23), and the original state returns. The auxiliary solenoid valve (20) then closes.

In these embodiments, this valve is bidirectional: instead of connecting the vacuum pump (40) to port 1 (41) and the vacuum chamber (43) to port 2 (42), the connections can be interchanged. In a previous patent application concerning a device designated as a vacuum valve, the valve contained a main valve head and an auxiliary valve head, where interchanging the two connections might cause misoperation of the auxiliary valve head because of the influence of pressure. However, because the skirt piece (9) is used instead of an auxiliary valve head, if the connections are interchanged, there is no misoperation, the skirt piece not being influenced by the pressure.

In these embodiments, the bell cap (33) is embedded in the cylinder casing (3) from above and secured by a threaded section (34) so that the inside of the bell cap (33) forms the pressure chamber (2). Inside the bell cap (33) lie two O-rings (35, 36), between which a groove (37) connects the pressurized gas line and the bypass channel (21). Because the edge of the bell cap (33) forms the valve seat (25) that touches the ring seal (22), the distance between the valve seat (25) and the ring seal (22) can be finely adjusted by screwing the bell cap (33) out or in. For example, when the suction force of the vacuum pump (40) is low, if the bell cap (33) is turned to raise it by 2 mm, the difference between the valve seat (25) and the ring seal (22) will be 3 mm. Hence, in the case of the first movement, the distance the valve head (32) can be raised will be about 3 mm, and the distance the skirt piece (9) can fall will be 2 mm. Thus the first stage of exhausting will be done with a gap of 1 mm between the skirt (19) and the value seat (25), overcoming the low suction of the vacuum pump (40).

Figure 4:
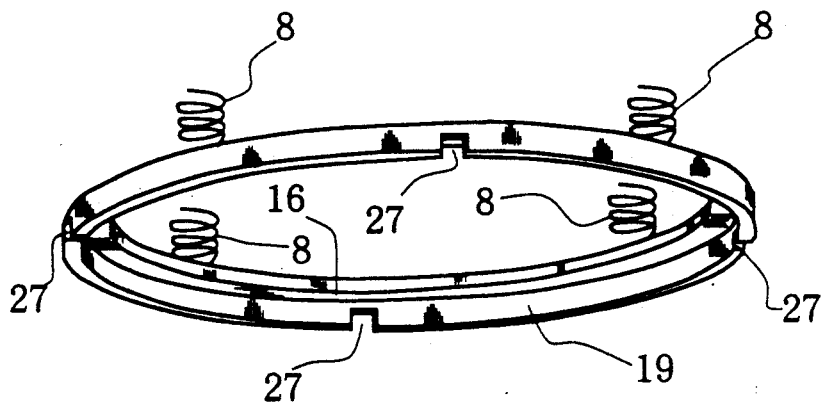
FIG. 4 is a perspective view showing a part in FIG. 1.

FIG. 4 is an enlarged view from the side looking up of the skirt piece (9), which is made of stainless steel or a similar material, and its associated springs (8). There are notches (27) in the skirt (19).

Figure 5:
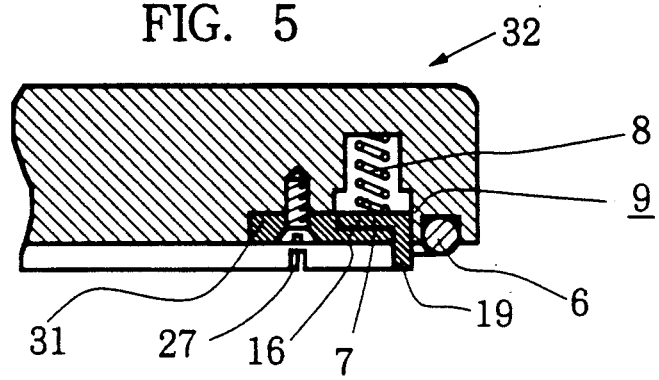
FIG. 5 is an enlarged view showing B part in FIG. 3.

FIG. 5 is an enlarged view of part B in FIG. 3, showing the state of the skirt rim (16) when arrested by the stop (31). Only the skirt (19) is protruding below the ring seal (6) in the valve head (32).

Figure 6:
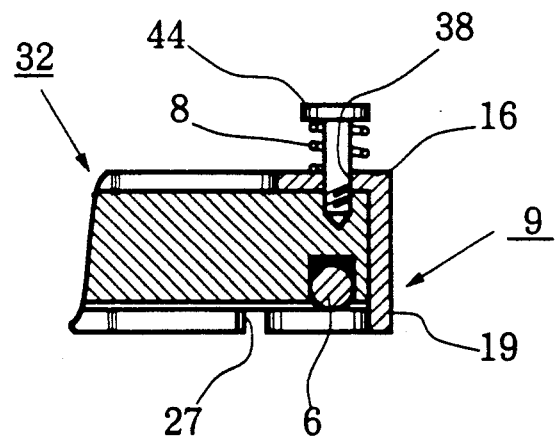
FIG. 6 is an enlarge view showing B part in the second embodiment of the present invention.

FIG. 6 shows the second embodiment of the invention, the outer part of the valve head (32) that extends perpendicularly downward being pushed down by a spring (8) and guided by a guide rod (44) passing through a hole (38) in the skirt rim (16), thus pushing the skirt (19).

Figure 7:
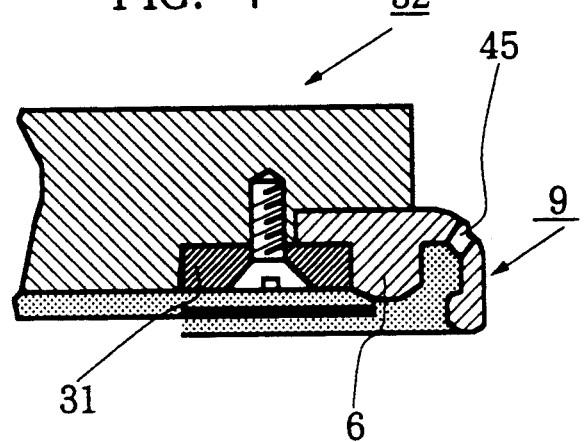
FIG. 7 is an enlarged view showing B part in the third embodiment of the present invention.
Figure 8:
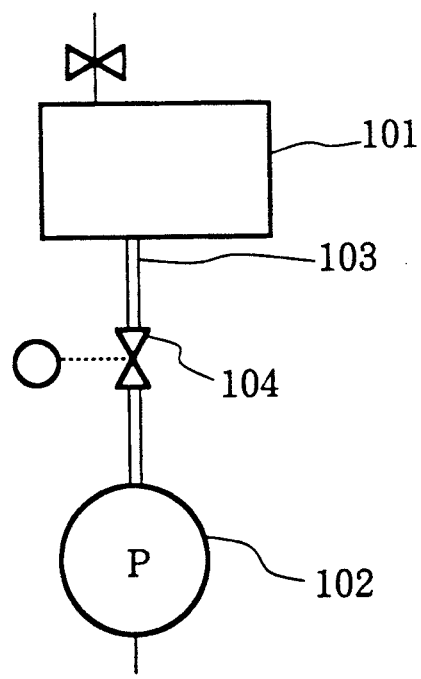
FIGS. 8 and 9 are views showing conventional functional diagrams.
Figure 9:
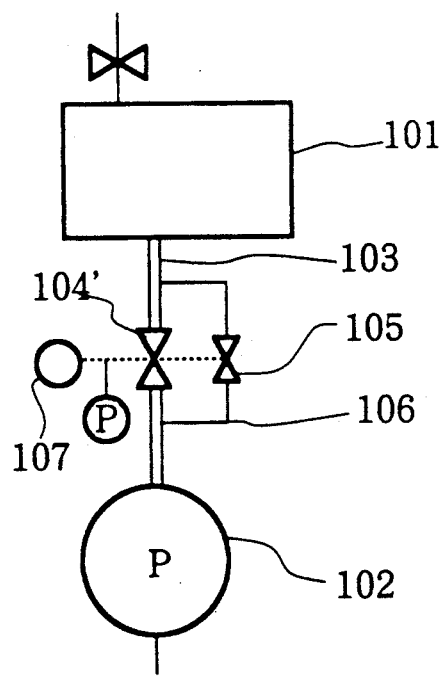

FIG. 7 shows the third embodiment of the invention of the skirt piece (9), the ring seal (6) in the valve head (32) and the skirt piece (9) being formed as a single part from flexible material. In the skirt (19) there is a hole (45) that acts as a leak vent.

It is sufficient for the leak vent, in the form of a notch, hole, or cut-out, to form an air path as a result of slightly raising the valve head.

In these embodiments, the timer (47) is started by the main solenoid valve (18), but it is also possible to start the timer (47) using a pressure sensor associated with the timer (47) sensing the pressure of the bypass channel (21) via the bypass line so that at a certain pressure it starts the timer (47). Also, by situating a pressure sensor in the vacuum chamber (43) or the port on the vacuum chamber side, it is possible to actuate the auxiliary solenoid valve (20) when the sensor detects a certain pressure has been reached.

In these embodiments, there is an auxiliary solenoid valve (20) outside, or alternatively, within the vacuum pump (40). However, instead of an auxiliary solenoid valve (20), it is possible to use, for instance, a rotary valve and a time delay to connect the pressure chamber (2) and secondary cylinder chamber (3'").

The following are the effects of this invention:

(a) It is possible to avoid the stirring up of particles by turbulence because of the skirt piece, which has a leak vent, and by opening the vacuum valve in two stages in conjunction with the use of a large-diameter valve apparatus.

(b) The connections of the two ports of the bidirectional valve to the vacuum chamber and vacuum pump are interchangeable.

What is claimed is:

1. A directional vacuum valve disposed between a vacuum chamber and a vacuum pump characterized by comprising:

a first shifting means for shifting a piston to a predetermined position as a result of imbalance of pressurized gas applied onto said piston in the inside of a cylinder casing, when said vacuum valve is operated;

a second shifting means for shifting said piston further from said predetermined shifting position of said piston as a result of an imbalance in the pressure of pressurized gas generated by opening said vacuum valve at after certain time at the predetermined shifting position;

a skirt piece having a leak vent which connects said vacuum chamber to said vacuum pump as a result of the shift of said piston by the first shifting means; and a main valve apparatus having a large diameter which connects said vacuum chamber with said vacuum valve as a result of the shift of said piston by the second shifting means.

2. A bidirectional vacuum valve according to claim 1, wherein said skirt piece is attached to a valve body in said main valve apparatus, and is pushed by springs against a main valve seat.

3. A bidirectional vacuum valve according to claim 1, wherein said skirt piece is integrally formed with a seal of said main valve body by an elastic member.

4. A bidirectional vacuum valve according to claim 1, wherein said leak vent is in the form of a notch, a hole, or a cutout.

5. A bidirectional vacuum valve according to claim 2, wherein said leak vent is in the form of a notch, a hole, or a cutout.

6. A bidirectional vacuum valve according to claim 3, wherein said leak vent is in the form of a notch, a hole, or a cutout.

* * * * *